US005742994A

United States Patent [19]

McDaniel

[11] Patent Number: 5,742,994

[45] Date of Patent: Apr. 28, 1998

[54] PIPE WRAP REMOVAL TOOL

[76] Inventor: Charlie A. McDaniel, P.O. Box 42254, Las Vegas, Nev. 89116

[21] Appl. No.: 653,049

[22] Filed: May 28, 1996

Related U.S. Application Data

[60] Provisional application No. 60/013,080 Mar. 8, 1996.

[51] Int. Cl.$^6$ .................................................. B23P 17/00

[52] U.S. Cl. ............................ 29/566.1; 30/90.1; 83/924

[58] Field of Search ............................... 29/270, 283, 33, 29/364.4, 566.1, 566; 83/924; 30/90.1, 90.4

[56] References Cited

U.S. PATENT DOCUMENTS

| | | | |
|---|---|---|---|
| 3,811,347 | 5/1974 | Heckhausen | 83/924 X |
| 4,769,910 | 9/1988 | Noon | 29/426.4 X |
| 5,074,043 | 12/1991 | Mills | 30/91.002 |
| 5,125,437 | 6/1992 | Pierce | 140/123 |
| 5,142,950 | 9/1992 | Takano et al. | 29/564 X |
| 5,145,283 | 9/1992 | Gowen | 285/381 X |
| 5,467,676 | 11/1995 | Hooper | 83/924 X |
| 5,531,026 | 7/1996 | Avery | 30/90.4 |
| 5,533,264 | 7/1996 | Wheary | 30/90.1 |

*Primary Examiner*—William R. Briggs

[57] ABSTRACT

A specialty tool designed for the efficient removal of strips of the outer sheathing (or "wrap") from underground pipe, consisting of a slotted cylindrical steel shaft (10) with female ratchet drive couplings (16) matched into each end, and having cutting discs (14) seated slightly inward from each end. Upon insertion into the slot (12) of a small loosened portion of the wrap and the engagement of the ratchets (18), a strip of wrap is simultaneously cut, pulled loose, and wrapped around the shaft (10) of the tool between the cutting discs (14), as the tool is directed by means of the ratchets (18) around the circumference of the pipe.

7 Claims, 4 Drawing Sheets

PIPE WRAP REMOVAL TOOL

PIPE WRAP REMOVAL TOOL

This is a non-provisional application claiming priority under Sec. 119e, of provisional application #60/013,080 dated Mar. 8, 1996, now abandoned.

BACKGROUND

1. Field of Invention

This invention relates to the installation and repair of underground pipe: specifically, to the necessary removal of a section of the tightly-bound outer sheathing (the "wrap") before such operations as welding, cutting, and splicing can be performed on the pipe.

2. Description of Prior Art

Heretofore, the wrap has been removed in any way possible, using knives and pliers, chisels and hacksaws. These methods are difficult and time-consuming. For example, in the applicant's experience, the removal of a ten-inch strip of wrap from a pipe measuring sixteen inches in diameter commonly involves the work of two men for an hour and a half or more.

The wrap has occasionally been burned off, but the resulting fumes are hazardous. It has also at times been ground off, but since the material itself is considered to be detrimental to the environment, allowing small bits to fall to the ground and collect there may result in eventual pollution of the ground water.

SUMMARY OF THE INVENTION

Objects and Advantages

My invention is a specialty tool that quickly and easily cuts, strips off and removes the wrap from the area of the pipe that is going to be worked on. The job that formerly took two men nearly two hours can now be accomplished by one man in less than twenty minutes, using my invention. This time advantage becomes even more significant when one considers that typically, at the job site, the operation is at a standstill while the wrap is being removed. Thus, the welder and his helper, as well as the backhoe and crane operators are often kept waiting while the laborers are busy removing the wrap.

Accordingly, several objects and advantages of my invention are:

(a) that it saves substantial time when performing installation or repair work on pipes;

(b) that it lowers costs for construction companies by improving worker productivity;

(c) that it offers safe alternatives to knives, hacksaws, and other removal instruments and methods; and (d) that it permits the removal of the wrap in one piece for proper disposal.

Further objects and advantages of my invention will become apparent from a consideration of the drawings and ensuing description of them.

DRAWING FIGURES

Figure 1:
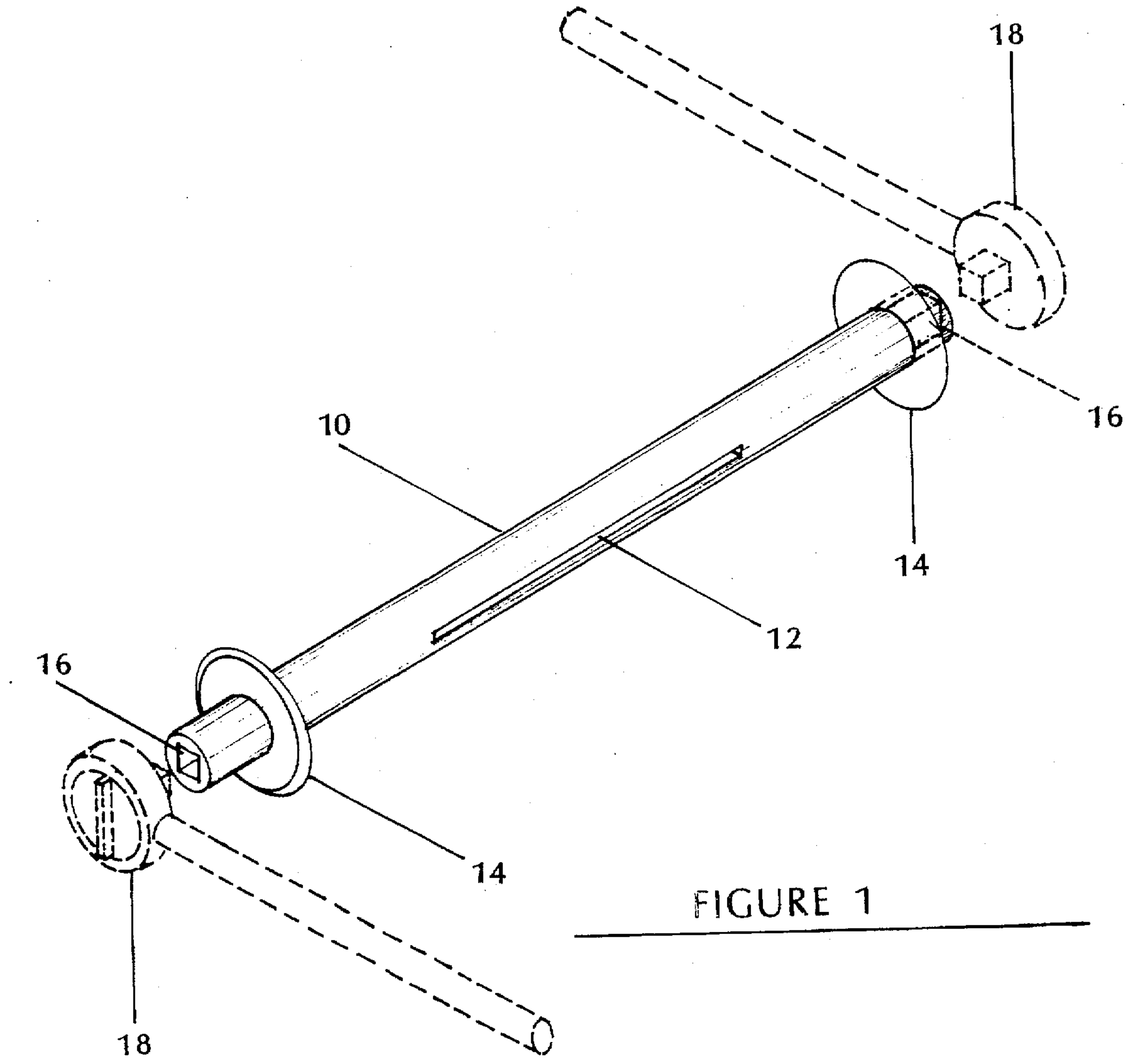
FIG. 1 is a perspective view of the Pipe Wrap Removal Tool.

FIGS. 3A through 3J comprise a series of drawings illustrating the operation of the tool.

REFERENCE NUMERALS IN DRAWINGS

| | |
|---|---|
| 10 | shaft |
| 12 | slot |
| 14 | cutting disc |
| 16 | ratchet coupling |
| 18 | ratchet |

DESCRIPTION OF THE PREFERRED EMBODIMENT—FIGS. 1 AND 2

The preferred embodiment of my invention is a device for the efficient removal of sheathing (or "wrap") from underground pipe, consisting of a slotted, cylindrical steel shaft 10 with female ratchet drive couplings 16 matched into each end, and with cutting discs 14 seated slightly inward from each end.

My prototype was constructed using a ¾" round steel rod, one foot long, which constitutes the shaft 10, having a slot 12 measuring ⅛" wide and 5" long, cut through its center, and having ⅜" female ratchet drive couplings 16 matched into each end, and having cutting discs 14 seated 1" inward from each end. The cutting discs 14 are thus spaced 10" apart in my prototype, because ten inches is the usual clearance width desired for a welding job on the pipe. The cutting discs 14 were constructed using steel washers 1 and ¾" in diameter with ¾" holes, the washers having been given a sharpened outer edge. The exact length of the slot 12 is not so critical, but five inches is in the optimum range for ease of operation.

The tool is producible in different sizes to accommodate pipe of various diameters. The cutting discs 14 are producible with hacksaw-type cutting edges for use on older pipe wrap, as well as with other style edges such as may in the future be required for a newer type wrap. The tool can be produced also from lightweight aluminum or other metal, or from other material. For example, it could conceivably be cast from a suitable type of plastic. The shaft 10 could also be produced from steel pipe, and the tool could be provided with interchangeable cutting discs 14 of varying diameter, made to snap into place by means of couplings. (This useful feature will be discussed below under "Operation of the Preferred Embodiment, FIG. 3J".)

From the description above, the advantages of my Pipe Wrap Removal Tool become evident: The tool is designed to efficiently strip sheathing from underground pipe; moreover, the tool is adaptable in size, material, construction, and methods of use, so that it can be accommodated to any type of sheathing on any size pipe.

OPERATION OF THE PREFERRED EMBODIMENT—FIGS. 3A THROUGH 5J

The drawings in FIGS. 3A through 3J illustrate steps in the operation of the Pipe Wrap Removal Tool.

Figure 3A:
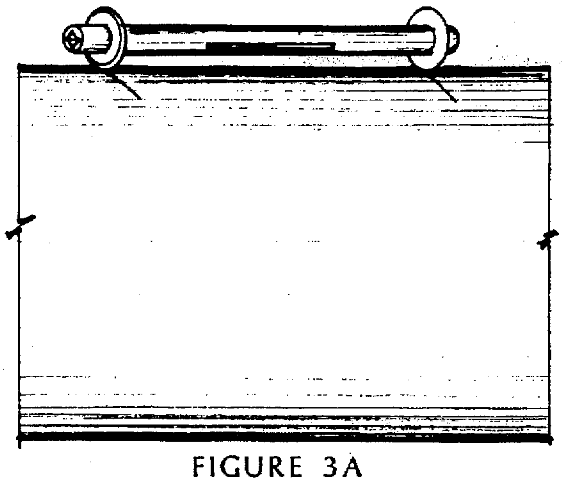

In FIG. 3A, the ratchets 18 are not yet in place on the tool. The tool has been positioned on the pipe and has been rolled back and forth several times by hand so that slight indentations have been made in the wrap by the cutting discs 14.

Figure 3B:
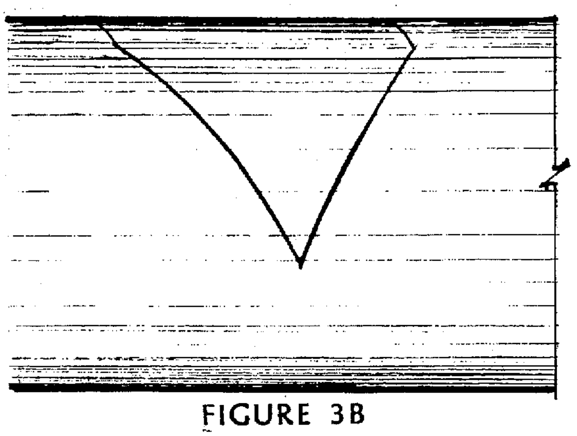

In FIG. 3B, a sharp knife has been used to make a 10" long (or so) V shaped cut through the wrap, joining the two indentations that were made by the cutting discs 14 in FIG. 3A.

Figure 3C:
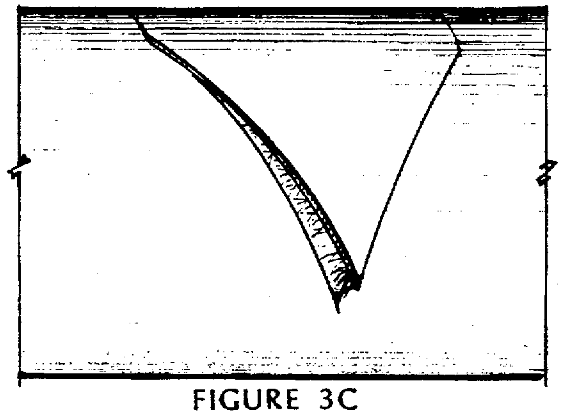

In FIG. 3C, a knife (or chisel) and pliers have been used to loosen five or six inches of the point of the cut that has been made in the wrap.

Figure 3D:
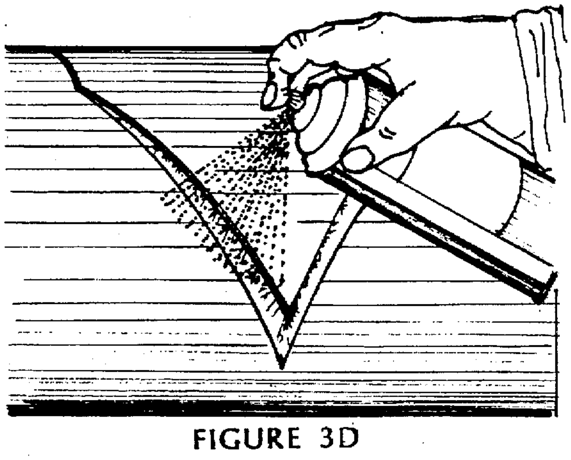

In FIG. 3D, the area of the wrap which is to be removed is sprayed with a penetrating oil (such as WD-40, WD-40 Company, San Diego, Calif. 92110 U.S.A.) in order to prevent the wrap from sticking to itself and/or to the tool. The wrap could instead be wiped with a rag soaked in diesel, but the step must not be omitted.

Figure 3E:
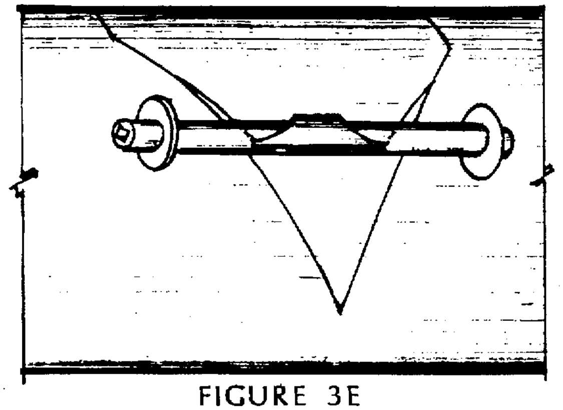

In FIG. 3E, the sprayed, loosened end of the wrap has been inserted into the slot 12 and wrapped around the shaft 10.

Figure 3F:
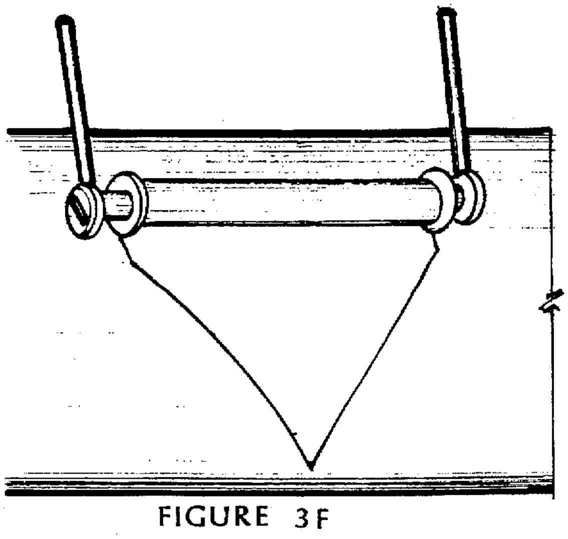

In FIG. 3F, the ratchets 18 have been engaged, so that the cutting discs 14 have now taken hold and are digging in, and the strip of sheathing ("wrap") is simultaneously being cut, pulled loose and wound around the shaft 10, as the tool is directed around the circumference of the pipe by means of the ratchets 18.

Figure 3G:
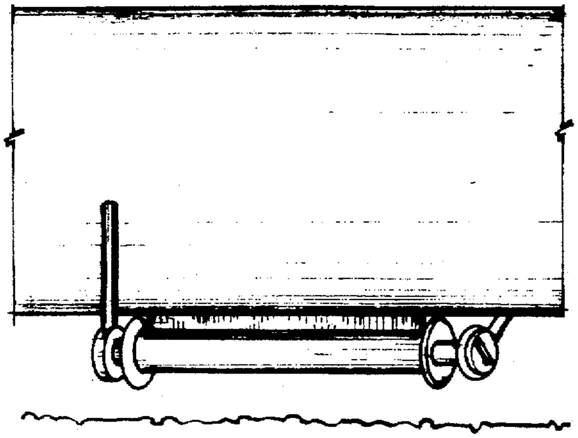

In FIG. 3G, with the ratchet 18 at right in the locked position, the tool has remained firmly in place at the bottom of the pipe while the ratchet 18 on the left side was temporarily disengaged, moved around (or under) the pipe, and then was repositioned from the other side. This same procedure will now be repeated with the other ratchet 18 in order to bring it around to the other side also. Thus it is obvious that the operation of the tool requires very little clearance between the pipe and the ground.

Figure 3H:
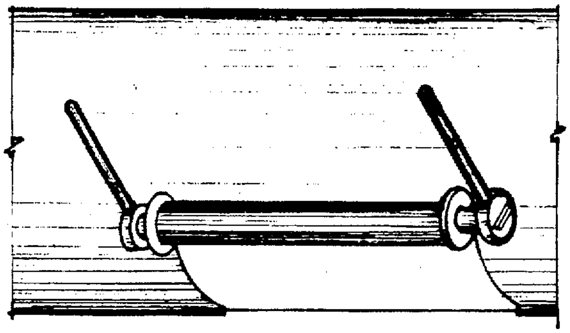

In FIG. 3H, the tool is nor proceeding up and around the remainder of the circumference of the pipe, where it will by then have cut and removed the entire strip of pipe wrap, all in one piece. Thus the reader can appreciate the ease with which a heretofore onerous task has been accomplished through the use of the Pipe Wrap Removal Tool.

Figure 3I:
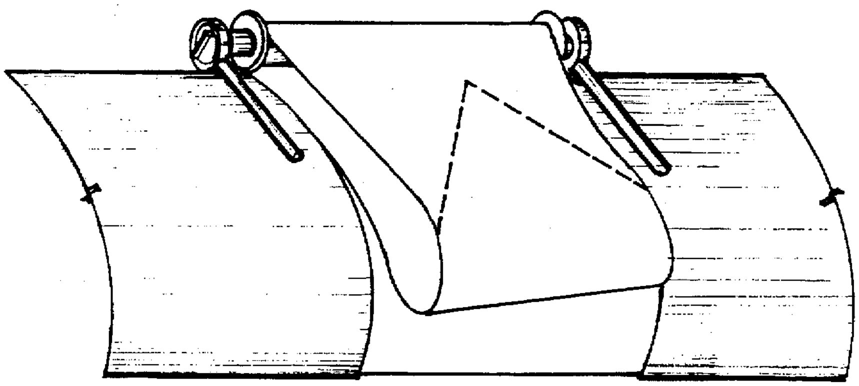

FIG. 3I illustrates a method for the removal of a strip of pipe wrap from the shaft 10 midway in the job. The ratchets have been reversed, allowing a small portion of the wrap to spin loose from the shaft 10. A new V out is made in the loosened wrap, indicated by the dotted lines in the drawing. The rolled-up wrap is then quickly and easily pulled off the shaft 10 ("spun off") and discarded; the new V out is then inserted into the slot 12 as in FIG. 3E, and the operation is resumed. This simple procedure is used on larger pipe when the roll of wrap becomes more than the shaft 10 will hold.

Figure 2:
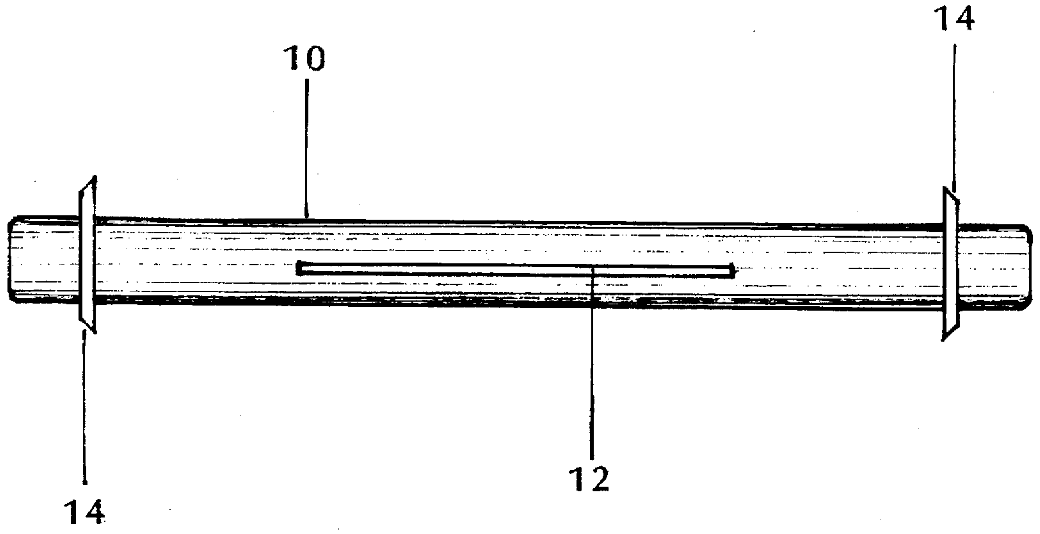
FIG. 2 is a plan view of a prototype.
Figure 2A:
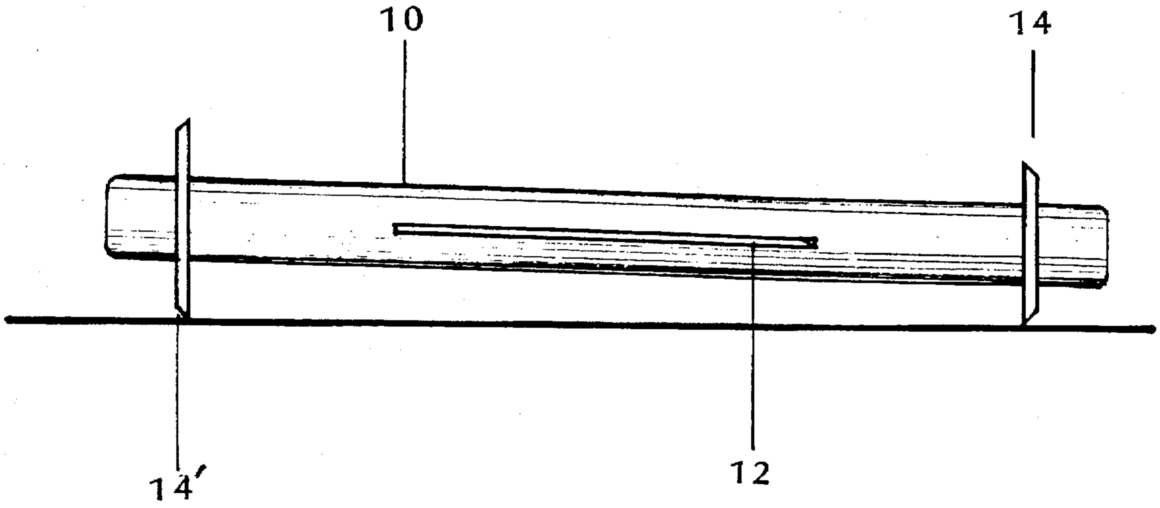
FIG. 2A shows the Pipe Wrap Removal Tool constructed using two cutting discs having different diameters in order to achieve the spiraling cut as illustrated in FIG. 3J.
Figure 3J:
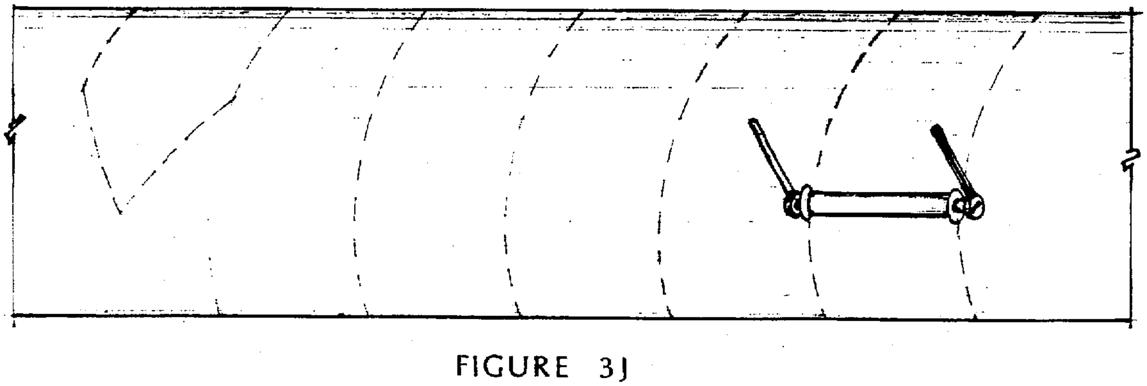

FIG. 3J illustrates the spiral cutting pattern of a Pipe Wrap Removal Tool which has been provided with interchangeable cutting discs 14, 14' in this case, of unequal diameters as shown in FIG. 2A. This spiral cut is a useful procedure when a wider than usual strip needs to be removed from the pipe. (With this modified tool is use, mathematical ratios between the various factors will need to be worked out and made available, so that the resulting cuts will be perfectly continuous, as pictured in FIG. 3J.)

There are times when a very wide portion of wrap (perhaps a 20 foot strip) needs to be removed from the center of a 40 foot length of standing pipe. New housing developments in the vicinity of an existing pipeline, for instance, might call for a series of shut-off valves to be installed in that particular location.

At present, when such a wide area of pipe needs to be stripped of its wrap, it is commonly ground off, despite all the drawbacks to such an operation. Great care must be taken to clean up and properly dispose of all the bits of material that fall to the ground, because it is considered to be very detrimental to the environment. However, the usual cumbersome efforts with chisels and pliers are obviously out of the question on such a large area, and the other alternative, burning the material off with a torch, is extremely hazardous, both from the standpoint of the poisonous fumes that are produced and from the risks engendered by possible leaks and spills. It is thus easy to see that a larger model of the Pipe Wrap Removal Tool, provided with interchangeable cutting discs 14, cutting in this case a swath of as much as 36" in a continuing spiral pattern as shown if FIG. 3J, provides a safe and efficient answer to this problem.

SUMMARY, RAMIFICATIONS AND SCOPE

Accordingly, the reader will see that the Pipe Wrap Removal Tool can be used to quickly and easily strip off and remove the wrap from the area of the pipe that needs to be worked on. Furthermore, the tool has additional advantages in that

- it offers safe alternatives to knives, chisels, hacksaws, and burning and grinding methods of removal;
- it saves substantial time when performing installation or repair work on pipe;
- it thereby lowers the costs for construction companies by improving worker productivity;
- it permits the removal of the wrap in one piece for proper disposal;
- its use requires clearance of mere inches between the pipe and the ground;
- it is adaptable in size, material, construction and special cutting features so that it can be accommodated to any type of sheathing on any size of pipe; and
- a modification of the tool (i.e., providing the tool with interchangeable cutting discs 14 of varying diameter) enables it to quickly and easily strip a very wide area of the pipe when called for.

Although the description above contains many specificities, these should not be construed as limiting the scope of the invention but as merely providing illustrations of some of the presently preferred embodiments of this invention. For example, the tool can be accommodated to any type of sheathing on any size of pipe; but in addition to this, the tool is in fact as easily capable of working on a plane surface as on a circular one, should such a need arise, and with minor modifications, the tool becomes useful wherever an adhering, flexible coating, or surface, or film, or skin needs to be stripped away from its underlying base, whether that base is circular, as in a pipe, or on a flat plane, and whether the endeavor is on a huge scale, as for instance in the realm of agriculture or construction, or conversely on a very tiny, delicate scale, as for example in scientific or medical research.

Thus the scope of the invention should be determined by the appended claims and their legal equivalents, rather than by the examples given.

I claim:

1. An instrument for the cutting, loosening, and removal of a long, even strip of material from a surface to which said material is adhering, comprising:

a generally cylindrical shaft having two ends and an elongated aperture generally centered between said ends for receiving and securing an end of said strip therein;

two cutting discs, each said cutting disc mounted on said shaft proximate an end of said shaft; and two female drive couplings, each machined into a respective end of said shaft, each of said drive couplings being configured to accept a male drive ratchet as means for controllably conveying one-way rotational movement to said shaft.

2. The instrument of claim 1 wherein said shaft and said cutting discs are constructed of steel.

3. The instrument of claim 1 wherein said shaft and said cutting discs are constructed of aluminum.

4. The instrument of claim 1 wherein said shaft and said cutting discs are constructed of a metal composition.

5. The instrument of claim 1 wherein said shaft and said cutting discs are constructed of a suitable plastic composition.

6. The instrument of claim 1 wherein said cutting discs are of unequal diameter.

7. The instrument of claim 1 wherein said cutting discs are removably and exchangeably mounted on said shaft.

* * * * *